Sept. 3, 1929.  A. E. GLANCY  1,726,820
LENS TESTING INSTRUMENT
Filed June 10, 1927  2 Sheets-Sheet 1
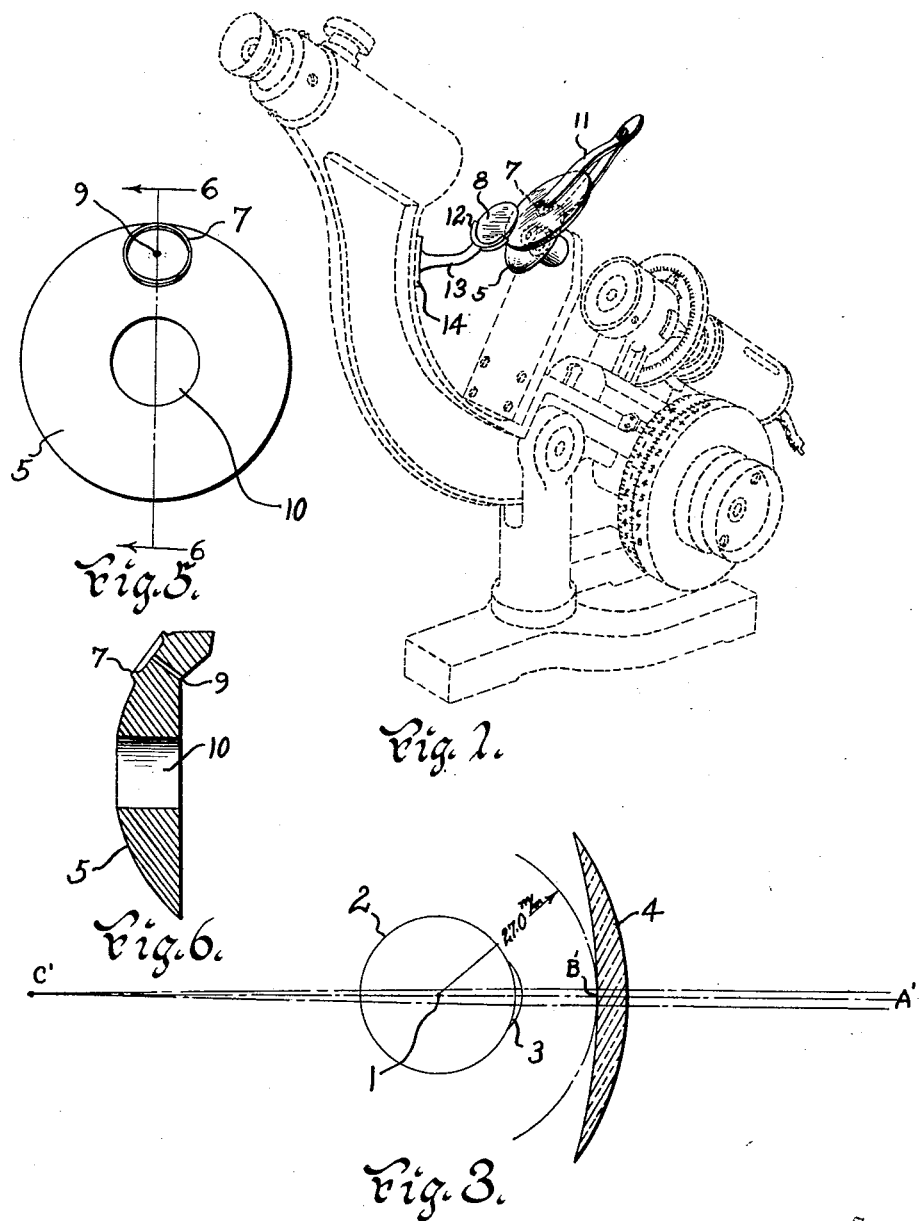
Inventor
Anna Estelle Glancy.
By Harry H. Styll.
Attorney Sept. 3, 1929.  A. E. GLANCY  1,726,820
LENS TESTING INSTRUMENT
Filed June 10, 1927  2 Sheets-Sheet 2
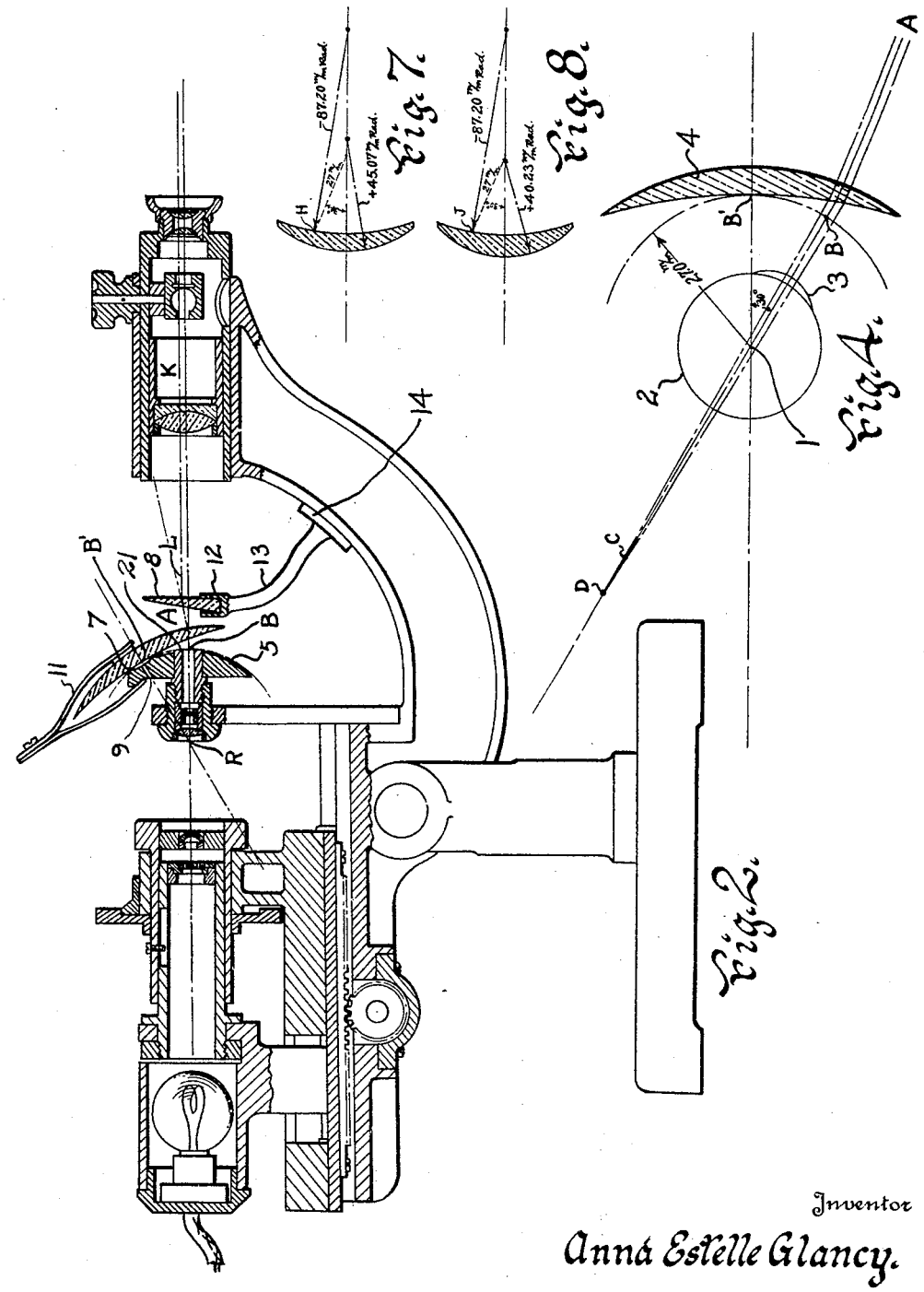
Inventor
Anna Estelle Glancy.
By Harry H. Styll.
Attorney Patented Sept. 3, 1929.

1,726,820

UNITED STATES PATENT OFFICE.

ANNA ESTELLE GLANCY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-TESTING INSTRUMENT.

Application filed June 10, 1927. Serial No. 197,806.

This invention relates to an improvement in apparatus for measuring the power of lenses and an improved process therefor and relates particularly to a new apparatus and a new process for measuring the marginal powers of ophthalmic lenses.

The device is for use with and is intended to supplement an instrument for measuring the powers of lenses, such as shown in United States Patent No. 1,542,112, Edgar D. Tillyer, June 16, 1925, Lens testing instrument.

The principal object of the invention is to provide a process and means for measuring the marginal powers of an ophthalmic lens at a prescribed distance from the center of rotation of the eye and at a prescribed distance from the center of the lens.

Another object of the invention is to provide means to test the difference in an optical prescription for deviation of the marginal power of the lens from its axial power at a prescribed distance from the center of the lens.

Another object of the invention is to provide means for obtaining immediately the marginal powers and astigmatism of ophthalmic lenses without the necessity of long trigonometric or mathematical calculations.

Another object of the invention is to provide means for positioning a lens to measure the marginal powers thereof on the same instrument and with reference to the same distance from the center of rotation of the eye as the axial power of the lens.

Another object of the invention is to provide direct means for measuring to what extent a prescribed marginal portion of the lens fails to fulfil the required prescription.

Another object of the invention is to provide means to verify the calculations for marginal deviations from axial power of a lens.

Another object of the invention is to provide means for measuring the effective power or vertex refraction of the marginal portion of an ophthalmic lens.

Other objects and advantages of the invention will become apparent from the following description taken in connection with the accompanying drawings, and it will be apparent that many changes in the arrangement and construction of parts and in the process may be made without departing from the spirit of the invention as expressed in the accompanying claims. I, therefore, do not wish to be limited to the exact details and arrangements shown, the preferred forms only having been shown by way of illustration.

Referring to the drawings:

Fig. 1 is a perspective view of a lens testing instrument embodying the invention.

Fig. 2 is a longitudinal cross section of Fig. 1.

Fig. 3 is a diagrammatic view showing the relation of the eye and the lens in axial relation.

Fig. 4 is a diagrammatic view showing the relation of the eye and the lens in angular or marginal relation.

Fig. 5 is a front view of the lens holder support.

Fig. 6 is a cross section on line 6—6 of Fig. 5.

Fig. 7 is a cross section through a lens on one major meridian.

Fig. 8 is a cross section through the lens of Fig. 7 on the major meridian at right angles thereto.

It is well known that in many types of ophthalmic lenses there is a variation in the marginal power from that of the axial power of the lens. In some forms of lenses, particularly strong lenses, this variation in power, both of astigmatism and focus is quite extensive and there has in the last few years come on the market for extensive use lenses in which the margins have been corrected in an endeavor to give equalized vision from the center to the margins of the lenses. The mathematical calculation of these marginal variations is a very intricate, laborious and difficult calculation involving mathematics that only those exceptionally skilled in mathematics and particularly the mathematics of lenses are able to make.

These lenses are manufactured by the lens manufacturers from carefully calculated curves by scientists and it becomes a matter of prime importance to be able to check these lenses to see if the finished lenses are within the prescribed limits of variation between their centers of axial portions and their margins. Without the use of my invention the checking for marginal errors of lenses would be a laborious and expensive process which would, of course, add to the cost of the lenses to the consumer.

It is, therefore, of the first importance to be able to test these lenses quickly, cheaply and accurately, and it is the prime object of the present invention to provide such means.

There are several efficient instruments on the market for testing the powers of lenses, particularly an instrument known as the lensometer, which is shown and described in Patent No. 1,542,112, Edgar D. Tillyer, June 16, 1925. This instrument, like the others, however, is designed and adapted only for the measurement of the axial powers of lenses. I have provided, therefore, means by which such an instrument may be made to test the marginal powers of ophthalmic lenses and worked out a method or process for carrying out such tests.

Fig. 3 shows diagrammatically an ophthalmic lens in front of an eye at rest. A beam of light A' B' C' passes through the lens in an axial direction, also through the center of rotation of the eye at 1, and comes to a focus at C'. The eyeball is represented by 2 and the pupil of the eye by 3. The back surface of the lens 4 is located 27 millimeters from the center of rotation 1 of the eye.

Fig. 4 shows diagrammatically the same lens 4 in the case of oblique vision. In this case there are two focal lines instead of a focal point. These are located at C and D. In order that the prescription of the lens should be fulfilled at every point of the lens as well as on the axis it is required that: BC=BD=B'C'.

If this were true the focus of the lens would always be the same distance from the retina for all angles of vision and the refractive action of the lens upon the eye would be the same for all directions of vision. In general this is not true, and it is essential to know how much BC differs from BD and how much each differs from B'C''. Previously this has only been done by laborious trigonometric calculations. It is the object of my device to provide means for measuring the reciprocal of these quantities on a lens measuring instrument as is commonly done for axial power of an ophthalmic lens.

In the diagrams of Figs. 3 and 4 the calculations are made on the theory that there is no lens in the eye. In other words, the lens of the eye is not taken into consideration.

Fig. 2 shows the adjacent parts of the commonly known lensometer as shown in the above referred to patent, and my auxiliary lens rest 5 is so positioned that the center of the lens rest 21 belonging to the instrument is aligned with the point B and the seat 7 of the auxiliary lens rest 5 is aligned with the point B' which is the axial center of the lens 4. The lens seat 7 is an annulus having an annular bearing edge for the eye side of the lens 4 and the axis of the said annulus forms a prescribed angle with the axial line such as marked thirty degrees in Fig. 4, and the bearing edge of the annulus is also a prescribed distance from the center of rotation of the eye marked in Fig. 4 as 27 millimeters. It will be understood that the angle 30 degrees and the distance 27 millimeters are not fixed figures but are simply the prescribed figures for this one illustration. The 30 degree angle is considered the usual limit of the field of vision, and the distance 27 millimeters from the center of rotation of the eye is the usual distance for ophthalmic lenses of this character. The deviation of the light owing to the prism in the marginal portion of the lens is nullified by the interposition of a suitable prism 8 in the line of the light after the light has emerged from the lens. KLAB represents the line of light, see Fig. 2.

The auxiliary lens holder 5 has a circular annular lens seat 7, as stated, which is adapted to receive the central or axial portion of the lens 4 on the eye side and has a small opening or orifice 9 or other means of indicating center of seat 7 alingned with the seat 7. It also has an opening 10 to receive the lens seat 21 of the instrument, as shown in Fig. 2. The lens 4 is held in place on the lens seat 7 of the auxiliary lens holder 5 by means of a spring clamp 11. The prism 8 is held in position in the axial line of the instrument by means of the prism holder 12 carried by the arm 13 and secured to the frame of the instrument at 14.

It will be understood that when the lens 4 is seated on the annular seat 7, as shown in Fig. 2, the axial line of the lens over the seat 7 will be in the prescribed angular relationship with the axial line KLAB, thirty degrees in the usual lenses, and also that the inner surface of the lens 4 on the seat 7 where it contacts with the annular seat 7 will be at the prescribed distance from the center of rotation of the eye, which is usually 27 millimeters, so that the line of light KLAB will pass through the prescribed marginal portion of the lens which is to be measured. In other words, my lens holder 5 is designed to seat the lens in the instrument for marginal measurement in a position wherein the lens is held at the exact prescribed relationship with the axial line of the instrument.

The readings on the instrument are made in the usual way as those for reading any lens which has cylindrical power. The auxiliary lens rest 5 provides means for positioning a lens to measure the marginal powers thereof on the same instrument and with reference to the same distance from the center of rotation of the eye as the axial power is measured. It provides a direct means of measuring to what extent the marginal portion of a lens fails to fulfil the required prescription. This difference between margin and center is important in strong lenses and is the basis of several well known types of marginally corrected lenses now on the market. It takes the place of calculations which are long and laborious, or it may be used to verify such calculations. It serves in demonstrating how large the marginal errors of an uncorrected lens may be, according to the power of the lens and the curves used, and it serves to test the marginal powers of a lens for which the claim is made that the marginal errors are corrected. Any ophthalmic lens may be measured, it being understood that the dimensions of 27 millimeters from the center of the eye and a thirty degree angle of vision are not fixed quantities, as stated above. The instrument may be used to determine the power for any selected distance from the eye or angle from the central vision.

The prism 8 is aligned with the axial line of the instrument so that the light passing through the marginal portion of the lens may be drawn back or bent to enter the telescope objective as a parallel beam approximately along the line of the instrument.

In Figs. 2 and 4, B' and B are respectively identical. The instrument measures all focal lengths from B which is the center of the rest 6. The axial power of the lens 4 is measured by resting the vertex of the lens B' centrally and in contact with the seat 7 and the instrument reads directly the reciprocal of the length B'C'. It also measures the reciprocal of focal length from B in Fig. 2. It will be noted that B is not on the surface of the lens but is on a circle drawn through the vertex of the lens with center coincident with the center of rotation of the eye. Hence in Fig. 2 the marginal portion of the lens is referred to a point which is the same distance from the center of rotation of the eye as when the axial or central power is measured.

When the reciprocal of B'C' in Fig. 3 is called the power of a lens, the terms effective power or vertex refraction are used. Now, effective power for oblique vision must be measured from B. If the marginal portion of the lens were in contact with the rest 21 the readings of the instrument would be different and would not give the true effect of the lens upon the eye. The position of the lens in Fig. 2 is such that the path of light through the lens in direction and convergence is the same as the path of light in oblique vision at a distant object. If it is desired to adopt other values for the distance from the center of rotation of the eye and for the angle of vision these dimensions would be used for making the auxiliary lens rest in place of those which are given, namely, 27 millimeters and 30 degrees, respectively. As illustrated in Fig. 2, the instrument measures the effective power or vertex refraction at a distance of 27 millimeters from the distance of the eye and at an angle of 30 degrees obliquity as indicated in Fig. 4.

The point 21 on the lens rest of the instrument is the contact point of the instrument itself and has been determined for measuring the letters at their center when contacting at this point. To correctly position the lens 4 in the instrument and to design the lens holder 5, you measure back from the point 21 or B, Fig. 2, the prescribed distance BR from the center of the eye, which in the present instance is 27 millimeters, and then lay off the line RB', Fig. 2, to the prescribed angle, which in the present instance is thirty degrees. The line RB' is the axial line of the lens 4 and about this axial line is arranged the lens annular seat 7 for holding the lens. It will be seen that when the lens is in this position in the instrument it is related to the prescribed angular relationship as well as to the proper distance from the center of rotation of the eye.

The operation of the device is as follows: The auxiliary lens rest 5 is placed over the lens rest 6 entering the opening 10 in the auxiliary rest 5. The axial center of the lens to be tested is placed over the center of the seat 7 on the lens rest 5 and clamped thereon by the spring clamp 11. This throws the desired point B of the lens in alignment, it being understood that the lens is usually tested in two major meridians, in the margin, as hereinafter referred to in the example of a lens that has been tested. The prism 8 is adjusted in line with the emergent ray and in axial line with the instrument and then the instrument is operated as explained in the patent referred to above.

The following shows the result of a lens tested and operated in this manner. The lens was a plus 6 diopter combined with a plus 1.5 diopter, index of glass 1.5232. Inside surface radius 87.2 millimeters, front surface toric. The radii of front surface were plus 45.07 and plus 40.23 millimeters, respectively, and the thickness of the lens was 4.3 millimeters.

Fig. 7 shows a cross section along the axis of the cylinder, and Fig. 8 shows a cross section at right angles to the axis for a lens located 27 millimeters from the center of rotation of the eye and the marginal point at an angle of thirty degrees from the center of the lens. Set the axial center of the lens to be tested over the center of the seat 7 of the auxiliary lens rest 5 and the point H in Fig. 7 over the center of the seat 21 of the instrument. The beam of light coming through the margin of the lens at H would be at such an angle that it would not enter the telescope objective. A prism 8, therefore, is placed in the line of the emergent beam of light from the lens to bend the light so that it will pass through the telescope objective as a parallel beam of light approximately along the axis of the instrument. The power of the prism may be easily determined by trying various power prisms until the light is bent to the required amount. In this case a 10.5 diopter prism or approximately that amount is added. The power of the lens is then measured in the usual way with the instrument. It will be found that the powers are plus 5.80 and plus 7.23 diopters, whereas the axial powers are plus 6 and plus 7.50 diopters. Set the axial center of the lens to be tested over the center of the seat 7 of the auxiliary lens rest 5 and point J in Fig. 8 over the center of the lens rest 21 of the instrument. In this case a 12.75 prism diopter prism or approximately that amount is added and the measurements taken in the usual way. It will be found that the powers are plus 5.56 and plus 7.36 diopters whereas the prescription calls for plus 6.00 and plus 7.50 diopters.

From the foregoing example it will be seen that there are two readings for each point in the major meridians at right angles to each other; this is true even for spherical lenses because in general even a spherical lens is a sphero cylindrical lens on the margin. The magnitude of the marginal powers depends on the prescription and the shape and thickness of the lens and the distance from the lens surface to the eye and the angle of vision from the axial line or center.

From the foregoing description of the apparatus and its operation it will be seen that I have provided simple, inexpensive and efficient means for carrying out the objects and advantages of the invention, and that I have provided a method or process of testing or verifying marginally corrected lenses without the use of long, laborious and difficult mathematical and trigonometric calculations.

Having described my invention, I claim:

1. The method of measuring the marginal power of an ophthalmic lens at a prescribed angle from the axis thereof comprising supporting a lens in a telescopic lens testing instrument with the axial line of the lens cutting the axial line of the lens system of the instrument at a prescribed distance from the lens contact point of the instrument and at the prescribed angle to the axial line of the lens system of the instrument and inserting a prism in the emergent beam of light so that the beam will enter the telescope objective as a parallel beam approximately along the axis of the instrument.

2. The method of measuring the marginal power of an ophthalmic lens at a prescribed angle from the axis thereof comprising supporting a lens in a telescopic lens testing instrument with the axial line of the lens cutting the axial line of the lens system of the instrument at a distance of twenty-seven millimeters from the lens contact point of the instrument and at an angle of thirty degrees to the axial line of the lens system of the instrument, and inserting a prism in the emergent beam of light from the lens so that the beam enters the telescope objective as a parallel beam approximately along the axis of the instrument.

3. In combination with a lens testing instrument having a lens contact point, a lens support having means to secure it to the lens contact point and having an annular lens seat, the axis of the annulus being arranged at a prescribed angle to the axis of the support engaging the lens contact point of the instrument and a contacting face of the annulus being at a prescribed distance from the point of intersection of the axis of the annulus and the axis of the part of the support attached to the contact point of the instrument.

4. In combination with a lens testing instrument having a lens contacting seat, a lens support having means to fit over the lens contacting seat and having an annular lens seat the axis of which is thirty degrees to the axis of the portion of the support fitting over the lens seat of the instrument and the contact face of the annulus being at a distance of twenty-seven millimeters from the point of intersection of the axis of the annulus and the axis of the portion fitting over the lens contacting seat of the instrument.

5. In combination with a lens testing instrument having a contact seat, a lens support having a portion fitted to the contact seat of the instrument and a lens contact seat the axis of which is in a prescribed angular relationship to the axis of the contact seat of the instrument and at a prescribed distance from the point of intersection of the axes, and means for holding a lens on the contact seat of the support.

6. In combination with a telescope objective lens testing instrument having a support, a lens support having a portion fitted to the support of the instrument and having a lens contacting seat the axis of which is at a prescribed angle to the axis of the lens seat of the instrument and at a prescribed distance from the point of intersection of the two axes, means for holding a lens on the lens contact seat, and a prism adapted to bend the emergent beam of light from the lens so that it enters the telescope objective of the instrument as a parallel beam approximately along the axis of the instrument.

7. In a device of the character described, a supplemental lens holder having a lens holding member comprising an opening adapted to fit over the lens contacting portion of a lens testing instrument and an annular lens seating portion the axis of the annulus being at a prescribed angle to the axis of the opening and the contacting edge of the annulus being at a prescribed distance from the intersection of the axis of the annular seat and the opening of the lens holding member.

8. The combination with a lens testing instrument having a contact seat, a lens support having a portion fitted to the contact seat of the instrument and a lens contact seat, the axis of which is in a prescribed angular relationship to the axis of the contact seat of the instrument and at a prescribed distance from the point of intersection of the two axes.

ANNA ESTELLE GLANCY.